United States Patent [19]

Hermansson et al.

[11] 4,205,113
[45] May 27, 1980

[54] FASHION FELT

[75] Inventors: Hans O. Hermansson, Halmstad; Bror E. Jönsson, Simlångsdalen, both of Sweden

[73] Assignee: Nordifa Industritextilier AB, Halmstad, Sweden

[21] Appl. No.: 891,499

[22] Filed: Mar. 30, 1978

[30] Foreign Application Priority Data

Apr. 7, 1977 [SE] Sweden .................................. 7704121

[51] Int. Cl.² ................................................ B32B 5/02
[52] U.S. Cl. ...................................... 428/286; 28/109; 28/111; 28/112; 428/296; 428/300; 428/301
[58] Field of Search ............... 428/102, 286, 296, 300, 428/301, 280, 282; 28/107, 109, 111, 112

[56] References Cited

U.S. PATENT DOCUMENTS

| 3,307,990 | 3/1967 | Homier | 428/300 |
| 3,649,429 | 3/1972 | Hughes | 428/300 |

Primary Examiner—Marion E. McCamish
Attorney, Agent, or Firm—Kane, Dalsimer, Kane, Sullivan and Kurucz

[57] ABSTRACT

A fashion felt of laminar structure comprising two outer layers at least one of which consists essentially of melt fibres, a layer of synthetic fibres, preferably synthetic fibre waste, positioned between the two outer layers, and a layer of surface batt secured to one of the outer layers. The laminar fashion felt possesses a high degree of plasticity and is given the desired shape in heat and compression treatments and the desired outlines in cutting operations. By varying the thickness of the batt layer and by compressing different parts of the product to a larger or lesser extent, the degree of softness or hardness of the product could be chosen in accordance with the end use thereof. The fashion felt is particularly useful for furniture and car interior upholstery and fittings. The invention also concerns a method of producing the felt.

5 Claims, 5 Drawing Figures

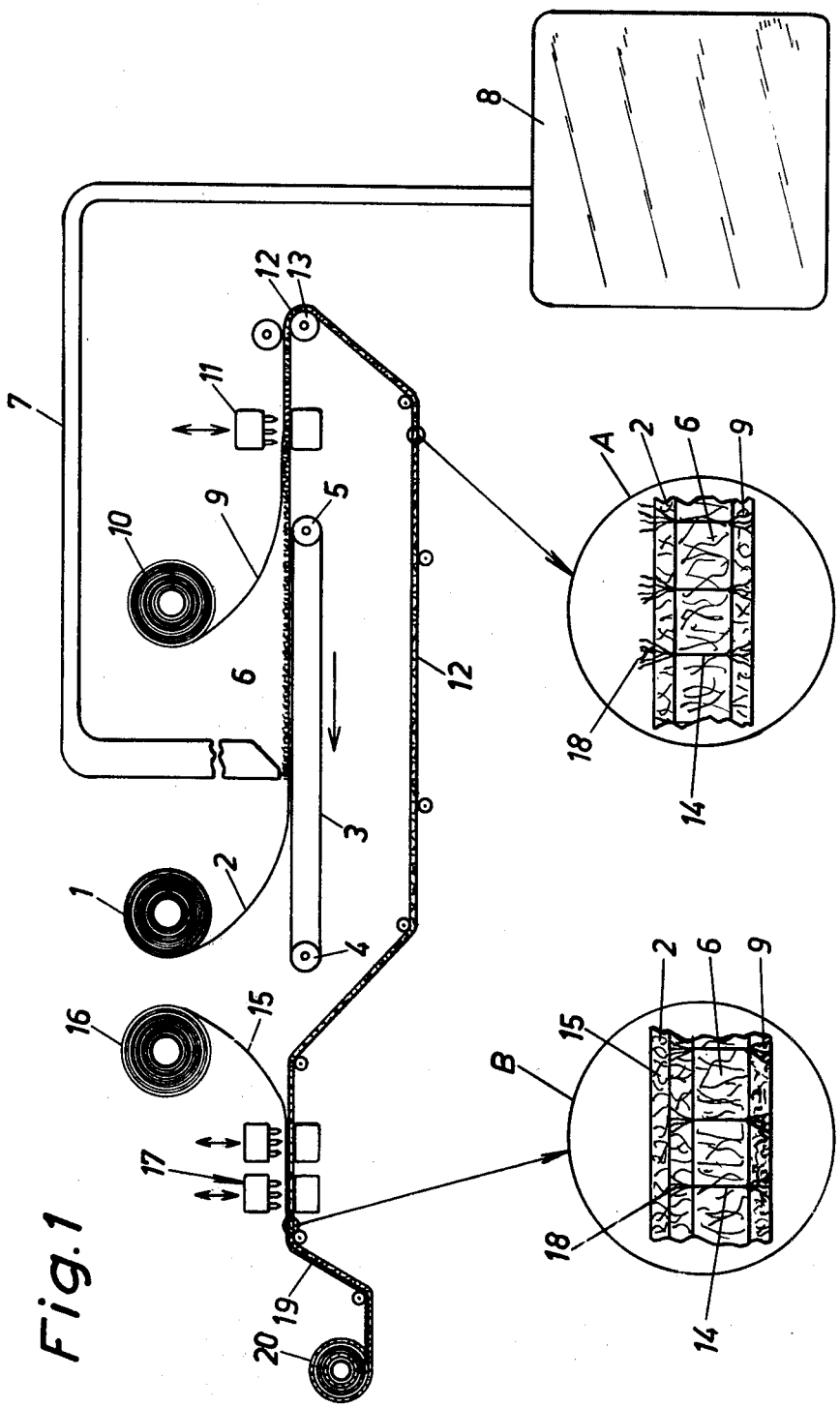

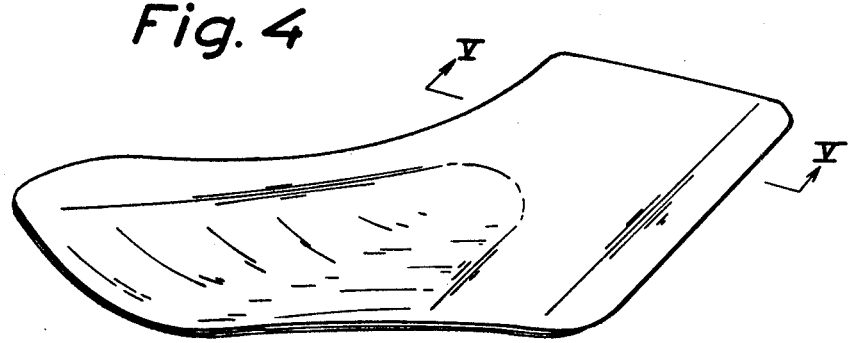
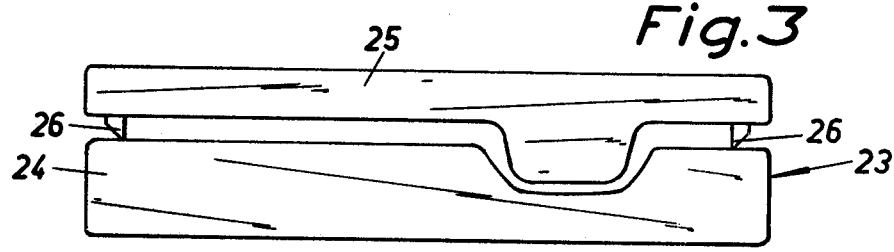
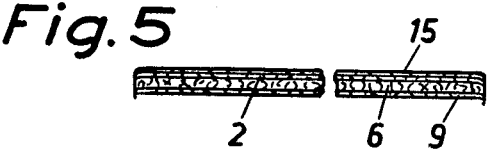
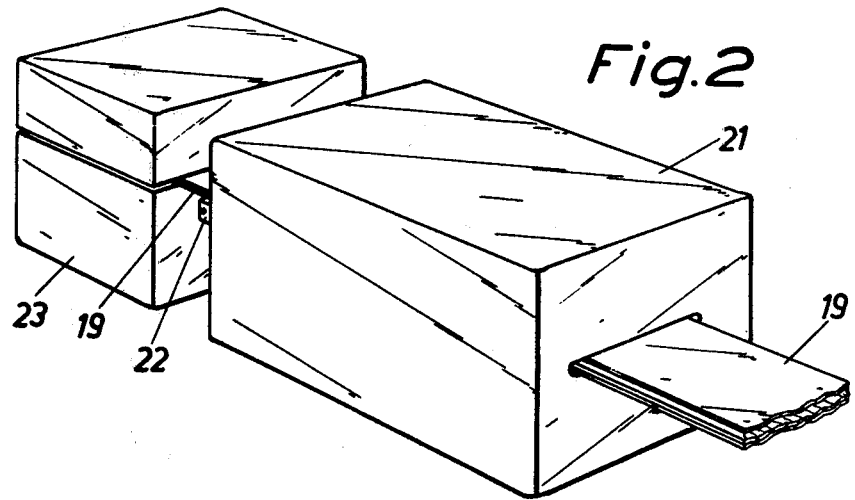

FASHION FELT

BACKGROUND OF THE INVENTION

The invention concerns a fashion felt, i.e. a product which substantially consists of fibres and which may be given any desired shape. This product is suitable for a great variety of uses, such as upholstery and interior equipment in cars, furniture, etc.

SUMMARY OF THE INVENTION

The characteristic feature of the invention is that the felt comprises two outer layers at least one of which essentially consists of melt fibres, said layer being separated by an intermediate layer of synthetic fibres, preferably synthetic fibre waste, with which intermediate layer the outer layers are interconnected by needling, and a layer of surface batt which is secured to one of the outer layers by means of needling. The felt is given the desired shape in heat and compression treatments and the desired outlines through cutting, preferably stamping.

In accordance with the invention, one of the outer layers, viz. the one supporting the surface batt, consists of conveniently texturized melt fibres, preferably polypropene fibres. The opposite outer layer may also consist of polypropene fibres or of a film. In addition, this layer may be made water-impermeable in a heat treatment.

The invention likewise concerns a method of manufacturing fashion felts in accordance with the invention. This method is characterised by the steps of applying a layer of synthetic fibres onto a continuously advancing web of melt fibres, preferably synthetic fibre waste, applying an outer layer on top of the last-mentioned layer, interconnecting said three layers by means of needling, turning the web thus produced by passing it round rollers, applying a surface batt on this web, which batt is secured thereto by means of needling, winding the web-like product thus produced onto a supply roll, withdrawing said web-shaped product from this roll and feeding it into an oven to heat the melt fibre layers, and then imparting to the heated web the desired shape and structure in a pressing tool.

BRIEF DESCRIPTION OF THE DRAWINGS

The invention will be described in more detail in the following with reference to the accompanying drawings, wherein FIG. 1 illustrates an installation for manufacturing a web forming the "basic fashion felt", FIG. 2 illustrates a device designed for carrying out the final treatment of the fashion felt, FIG. 3 illustrates a cross-sectional view through the device shown in FIG. 2, FIG. 4 illustrates a finished product in accordance with the invention, and FIG. 5 is a sectional view through line V—V of FIG. 4.

DETAILED DESCRIPTION OF A PREFERRED EMBODIMENT

The apparatus shown in FIG. 1 for the manufacture of a fashion felt in accordance with the invention comprises a supply roll 1 holding a fibre web 2 which is fed onto a continuous conveyor belt 3. When the synthetic fibre web 2 has been deposited on the conveyor belt 3, which belt preferably is driven at a constant speed about the rollers 4 and 5, a layer 6 of filler fibres, preferably consisting of synthetic fibre waste, is deposited on the fibre web 2. The synthetic fibre waste is fed through a conduit 7 from an apparatus 8 designed to break up textile waste into fibres. On top of the layer 6 is applied a further outer layer 9 which is withdrawn from a roll 10, such that between them the outer layers 2 and 9 enclose the filler layer 6. The web thus obtained is fed through a needling apparatus 11 wherein the three layers 2, 6, and 9 are joined together. The web 12 thus joined together then travels over a conducting roller 13 and the web now has the appearance illustrated in the circle A which shows that in the needling apparatus 11 fibres 14 from the layer 9 have been pushed through the middle layer 6 down (up in circle A) into the other outer layer 2 and are anchored therein by their ends. The web 12 further travels over guide and link rolls, finally to be coated with a surface batt 15 which is withdrawn from a supply roll 16. The surface batt 15 is needled to the web 12 in a needling apparatus 17 and following its passage through the needling apparatus 17, the web has the appearance illustrated on a heavily enlarged scale in circle B. It should be noted that the end tufts 18 formed by the fibres 14, to a very large extent contribute to the positive securement of the surface batt 15, as during the needling of the surface batt 15 fibres from the batt are needled into the end tufts and thus are anchored thereto. The felt web 19 thus produced is wound onto a supply roll 20 from which the desired components may be produced at a later stage.

FIG. 2 illustrates a device designed to produce the desired components from the felt web 19 in the process of compression and cutting operations. For this purpose, the device consists of a first section 21, which could be denominated oven and into which web material 19 is fed and heated to the softening temperature of the synthetic fibres. At the exit of the oven 21 is disposed an infra-red heating element 22 which, if desired, illuminates the web from below to such a degree that the fibres melt together and form a water-impermeable layer on the product. Following the oven 21 is positioned a pressing tool 23 comprising two sections, viz. a lower, stationary section and an upper section which is arranged to be displaced upwards and downwards.

FIG. 3 is a sectional view through a preferred embodiment of the pressing tool 23. The pressing tool comprises—as mentioned above—a lower stationary section 24 and an upper, vertically displaceable section 25. When a sufficient length of web material 19 has been inserted between the sections 24, 25, during which insertion the upper section assumes its upper position, section 25 is lowered and the web 19 is compressed between the tool sections and takes on the desired shape. At its periphery, section 25 is provided with cutting members 26 designed to stamp out the outlines of the desired work piece, whereby in the pressing tool is obtained not only the desired shape as a result of the compression, but also the desired cutting of the work piece.

FIG. 4 illustrates one contemplated example of an article manufactured from the fashion felt in accordance with the invention. This article may be part of the interior upholstery and equipment of a car. FIG. 5 shows a cross-sectional view through this article and illustrates the manner in which the surface batt 15 is pulled down over the edges all around the article during the stamping-out of the article from the heated fashion felt by means of a pressing tool, whereby in addition to other advantages is gained also the one that the edges will be aesthetically attractive in appearance as they become entirely covered by the surface layer 15.

One advantage of particular importance in the case of car interior equipment is that in contrast to materials used earlier, such as e.g. hard wood fibreboard slabs, the various equipment components may be shaped in a simple manner to fit their individual usage and be designed to suit the surroundings in a very convenient manner. Compared with the shaping of hard fibreboard slabs used hitherto, the productivity may be increased considerably, and by choosing a suitable kind of synthetic fibre it is possible without difficulty to reduce fire hazards inside the vehicle. Furthermore, through the choice of synthetic fibre, the generation of poisonous gases in the case of a fire is prevented. These advantages naturally are obtained also when the product is used in furniture. A suitable choice of material for this purpose is polypropene. A surface texture that fits the desired appearance is easily obtained in that a fibre layer is applied in the form of a surface batt, which possesses the desired characteristics. Whatever the nature of the fibres, it is always easy to needle the fibres to the support so as to obtain a satisfactory adhesion (bond) between the layers.

By shaping the sections of the pressing tool 23 in conformity with the desired end product, different areas of the articles manufactured may be compressed to a larger or lesser extent, whereby varying hardness or in other words varying softness of the object is obtained, ranging from solid plastics suitable to serve as mountings for screws and the like, to a soft structure having considerable noise-reducing properties. Owing to the middle layer comprising a filler batt, the surface layers 2, 9 are kept so far apart that following the heat treatment of the surface layers the product possesses satisfactory stiffness and may be used for self-supporting structures.

Finally should be pointed out that the material does not either give off any gaseous products that may deposit on the car windshields, so-called fogging, which could reduce the visibility.

By the expression "melt fibre" as used herein is to be understood synthetic fibres which become soft and somewhat tacky at a temperature of 50°-60° C., i.e. at a temperature which exceeds the temperature at which the product is intended to be used.

The invention is not limited to the embodiments as described and illustrated but a variety of modifications are possible within the scope of the appended claims.

What we claim is:

1. An improved fashion felt comprising a first outer layer and a second outer layer, at least one of said outer layers consisting essentially of melt fibres, a third layer of synthetic fibres, preferably synthetic fibre waste, positioned intermediate said first and second layers thus separating said layers, said first and second layers interconnected to said third intermediate layer by needling, and a layer of surface batt secured to said first outer layer by means of needling, said felt having been given the desired shape in heat and compression treatments and the desired outlines through cutting, preferably stamping.

2. An improved fashion felt as claimed in claim 1, wherein said first outer layer supporting said surface batt consisting of texturized melt fibres, preferably polypropene fibres.

3. An improved fashion felt as claimed in claim 1, wherein said second outer layer opposite said surface batt consists of a film.

4. An improved method of producing an improved fashion felt, comprising the steps of
applying onto a continuously advancing web of melt fibres a layer of synthetic fibres, preferably synthetic fibre waste,
applying an outer layer of melt fibres on top of said synthetic fibre layer,
bonding together by means of needling said three layers composed of said melt fibre web, said synthetic fibre layer and said layer of melt fibres,
turning the thus formed composite web by passing said web round rollers,
applying a surface batt on said web,
securing said surface batt to said web by needling,
winding the thus formed web product onto a supply roll,
withdrawing said web product from said roll and feeding it into an oven to heat said web and layer of melt fibres, and
thereafter imparting the desired shape and structure to said heated web product in a pressing tool.

5. An improved method as claimed in claim 4, comprising
heating the web face opposite said surface batt in the passage thereof between said oven and said pressing tool, preferably by exposing said face to infrared heat, whereby a water-impermeable surface layer is formed.

* * * * *